United States Patent [19]

Maciag et al.

[11] 4,201,123
[45] May 6, 1980

[54] SNAP DOOR VENT WITH SPRING

[75] Inventors: Edmund D. Maciag, Torrance; Garold D. Frymire, Buena Park, both of Calif.

[73] Assignee: Elixir Industries, Gardena, Calif.

[21] Appl. No.: 957,450

[22] Filed: Nov. 3, 1978

[51] Int. Cl.² .......................... B60H 1/26; E05F 9/00
[52] U.S. Cl. .................................. 98/2.14; 98/42 R; 98/85; 49/34; 49/94; 296/137 B; 296/137 J
[58] Field of Search .................. 52/198–200; 49/34, 110, 94, 112; 98/2, 2.14, 20, 42 R, 78, 85; 296/137 R, 137 J, 137 B

[56] References Cited

U.S. PATENT DOCUMENTS

| | | | |
|---|---|---|---|
| 87,668 | 3/1869 | Hays | 49/94 |
| 624,874 | 5/1899 | Sauers | 49/94 |
| 693,193 | 2/1902 | Waldmire | 98/85 |
| 861,872 | 7/1907 | MacDonald | 98/85 |
| 901,544 | 10/1908 | Moon | 98/85 |
| 1,432,135 | 10/1922 | Sylvan | 49/94 |
| 1,492,720 | 5/1924 | McCartney | 98/85 |
| 2,939,375 | 6/1960 | Herman | 98/2.14 |
| 3,325,951 | 6/1967 | Johnson | 49/34 |
| 3,401,620 | 9/1968 | Armstrong et al. | 98/2.14 |
| 3,918,226 | 11/1975 | Naidus | 52/200 |

Primary Examiner—Henry C. Yuen
Attorney, Agent, or Firm—Gausewitz, Carr & Rothenberg

[57] ABSTRACT

A vehicle ventilation opening is covered by a dome-shaped cover that has a pair of generally triangular oppositely disposed lateral cover openings extending from an uppermost portion of the cover. A pair of generally triangular shaped and outwardly bowed resilient doors are pivoted at opposite sides of the cover so that their adjacent but mutually spaced free end portions move between an inwardly displaced open position and a closed position wherein the free ends of the doors are at the high point of the domed cover and the doors seal against the inside of the cover at the peripheries of the openings. A compression spring is interposed between the adjacent free ends of the doors to force the doors against their hinged connections at the sides of the cover throughout all the positions of the doors and to facilitate an over-center toggle action which is provided by the resilient curved doors themselves to snap the doors to closed position and force them into sealing engagement with the peripheries of the cover openings.

5 Claims, 9 Drawing Figures

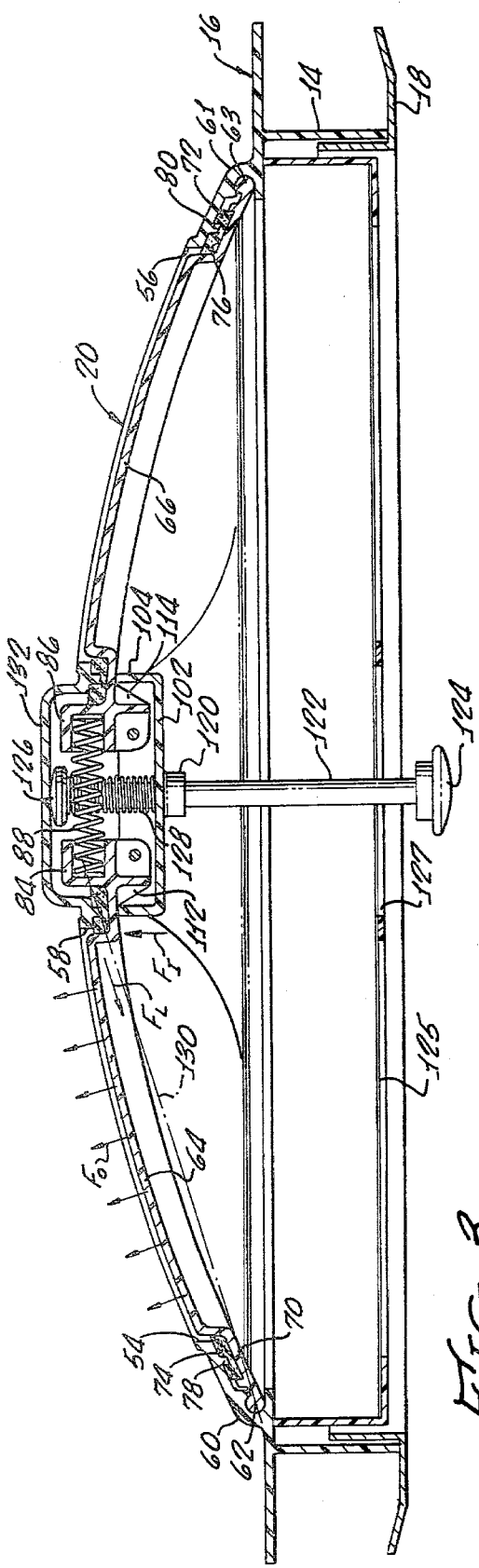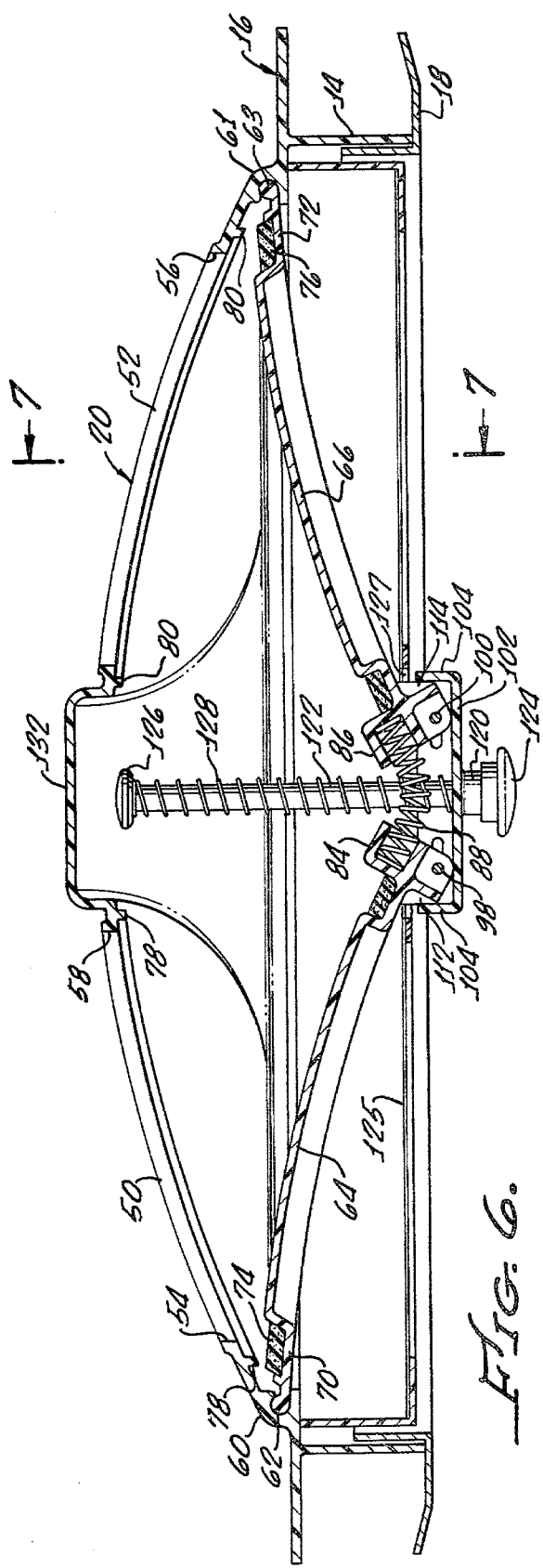

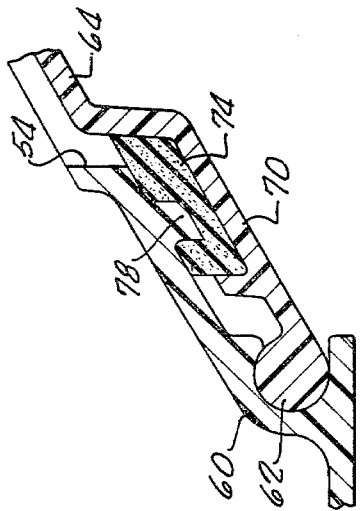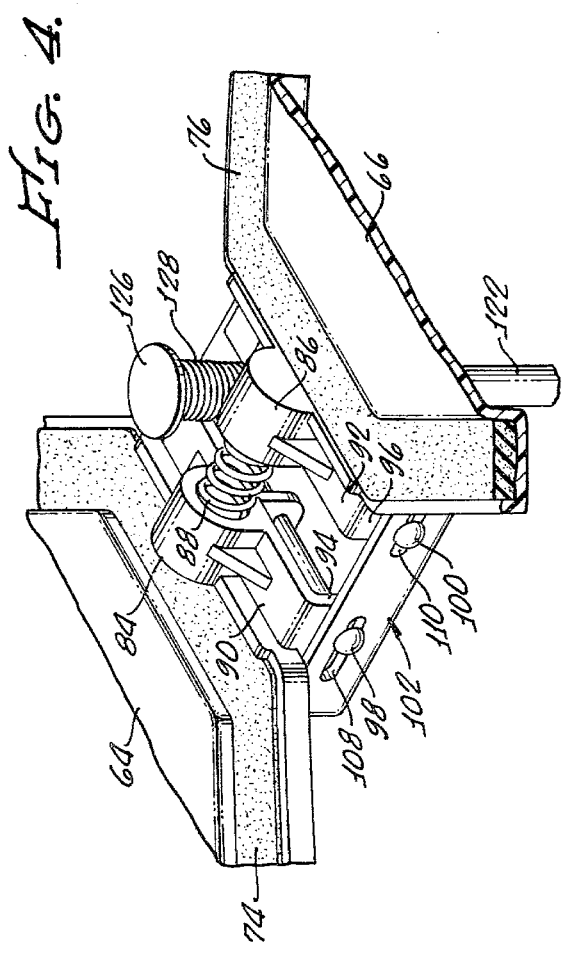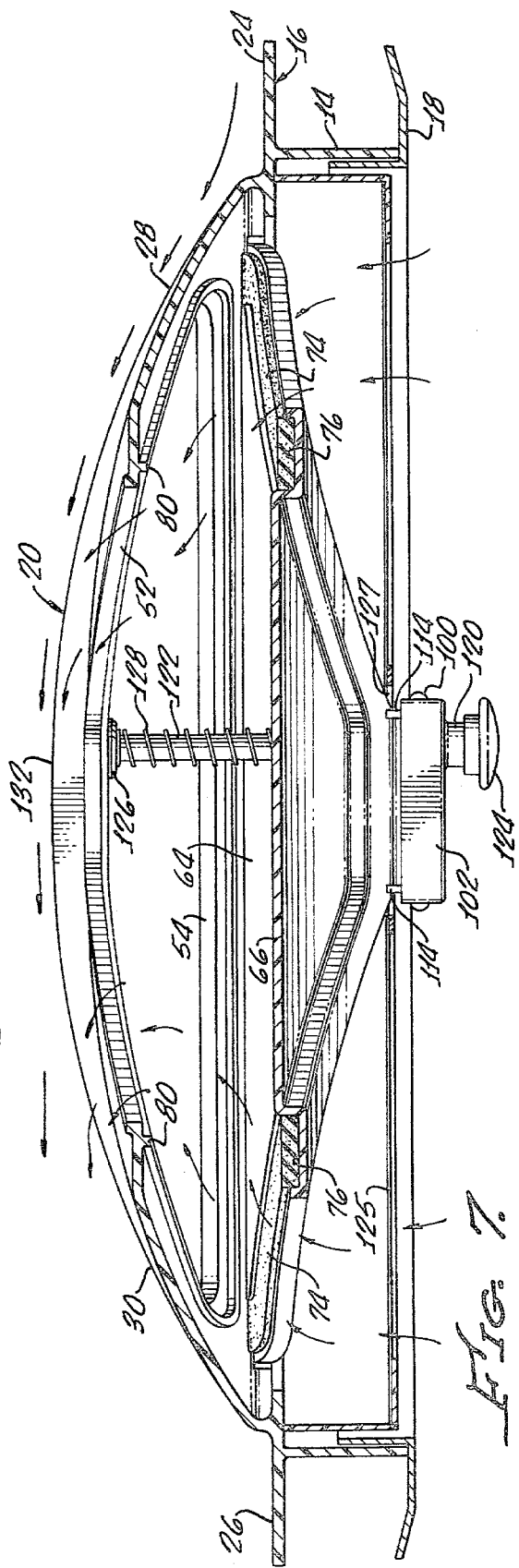

SNAP DOOR VENT WITH SPRING

The invention of this application is an improvement on the vent disclosed and claimed in the co-pending application of Edmund D. Maciag for Snap Door Vent, Ser. No. 957,449 filed Nov. 3, 1978 and assigned to the assignee of the present application.

BACKGROUND OF THE INVENTION

Recreational vehicles such as campers, trailers, motor vans, motor coaches and the like are commonly provided with ventilation devices to provide for interior ventilation both during vehicle motion and when the vehicle is at rest. For ventilation during vehicle motion there is commonly provided a streamlined body in the form of a scoop fixed to the exterior of the vehicle, to the side or to the roof, with a forwardly facing opening through which air is forced into the vehicle during motion. In some arrangements air is forced across the vehicle ventilation opening and, by virtue of its flow across the opening, extracts air from the vehicle. One such arrangement is shown in U.S. Pat. No. 4,038,911 for multi-directional vent assigned to the assignee of the present invention.

In almost all of such vehicle vents, as in most other types of ventilation devices, it is not only important that proper ventilation be provided but it is essential that the opening be adequately sealed when ventilation is not desired. Thus, most prior devices have movable covers or doors and employ complex, expensive operators or latches that permit movable vent doors to be shifted between closed and open positions, and which also firmly hold the parts in closed, sealed position. For example, U.S. Pat. No. 4,038,911 employs a widely used type of worm gear and bell crank linkage actuator. Although such an actuator effectively moves and holds the doors and covers in various positions, it is a relatively complex mechanism and is indirect in its operation since it requires many turns of a handle and gearing to effect the desired door motions.

Devices that employ a scoop to gather air flowing into a forwardly facing opening provide greatly increased wind resistance. Further, when a vehicle bearing such a vent enters a garage with a relatively low doorway, any contact of such a vent with fixed overhead structure is likely to result in irreparable damage to the vent.

Most vents of the prior art can take advantage of wind flow only in one direction relative to the vehicle. Thus, when the vehicle is at rest, wind flowing from a direction other than the front of the vehicle will provide relatively little ventilation of the interior. In the above-mentioned patent a multi-vent directional vent is provided which permits effective ventilation with wind flowing in any direction but requires two separate pivoted closure members and two separate gear and linkage actuators for operating and sealing the closures.

Accordingly, it is an object of the present invention to provide a vent assembly that eliminates or minimizes above-mentioned problems.

SUMMARY OF THE INVENTION

In carrying out principles of the present invention in accordance with a preferred embodiment thereof a vent cover that is adapted to be secured to a vehicle in position to cover a ventilation opening thereof has a front wall that slopes rearwardly and outwardly to an outer cover region that is displaced outwardly from the ventilation opening. The cover opening is provided with a door positioned at least in part at the outer cover region. The door has a pivotal connection to the cover and latch means exert a force on the door directed toward the pivotal connection. Preferably, the door and opening are of generally triangular shape. According to a feature of the invention the door is resilient and the latch means are formed by a toggle that includes the resilient door and which holds the door in closed position. Sealing of the door in closed position is still further enhanced by providing the door with an outward curvature and is still further enhanced by the generally triangular configuration of door and opening so that a compressive force exerted against the apex or short side of the triangular configuration door will tend to further curve the door outwardly and enhance the sealing pressure around the entire door periphery.

Conveniently, two laterally opposed openings and resilient doors are provided with a compression member interposed to complete the over-center toggle action.

BRIEF DESCRIPTION OF THE DRAWINGS

FIG. 3 is a section taken on lines 3—3 of FIG. 1.

FIG. 4 is an enlarged fragmentary perspective of the interconnection between free end portions of the two opposed doors.

FIG. 5 is an enlarged sectional detail showing the pivotal connection of a door to the vent cover and frame, illustrating part of a peripheral seal.

FIG. 6 is a view similar to that of FIG. 3 but showing the doors in open position.

FIG. 7 is a section taken on lines 7—7 of FIG. 6.

DETAILED DESCRIPTION

Figure 1:
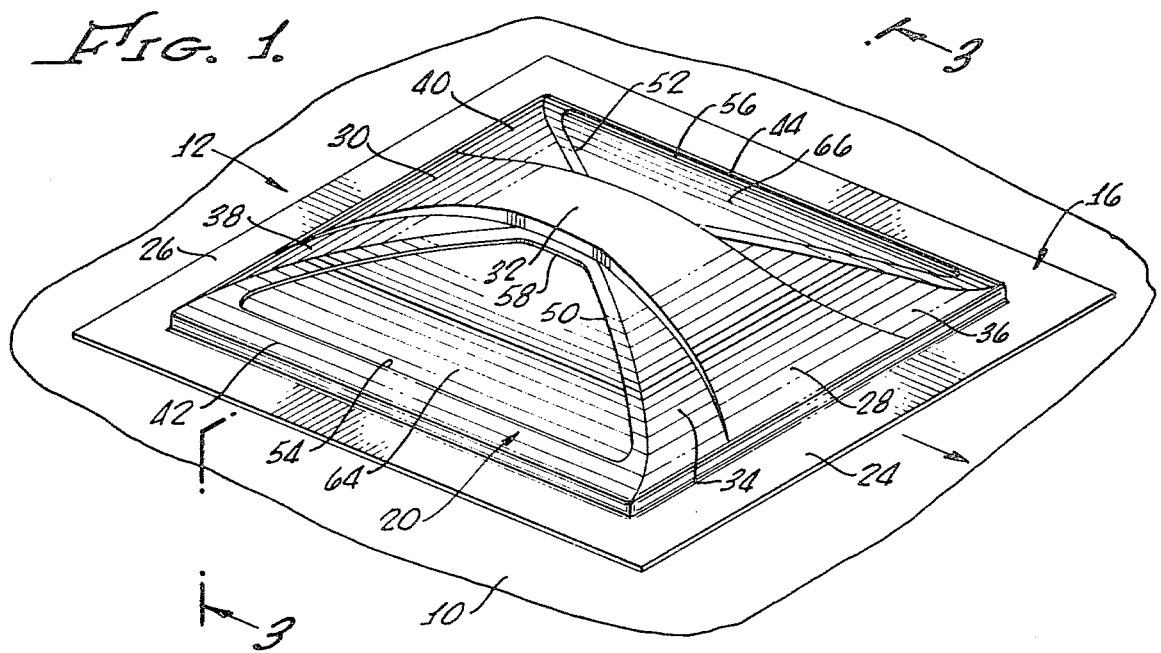
FIG. 1 is a pictorial illustration of a vent assembly embodying principles of the present invention showing the assembly mounted upon the roof of a vehicle.
Figure 2:
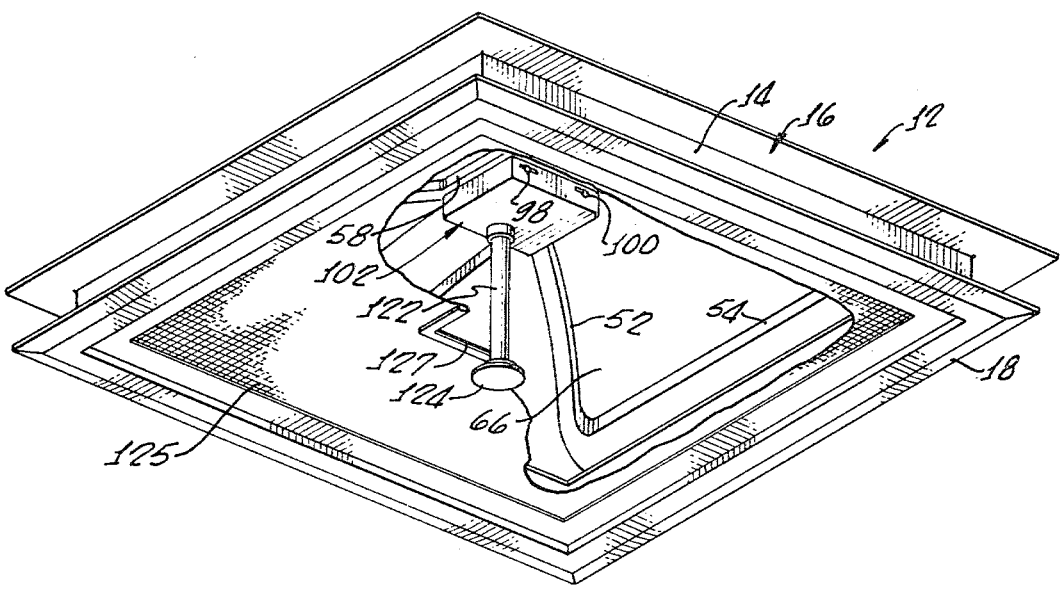
FIG. 2 is a pictorial illustration, with parts broken away, looking upwardly at the inside of the vent assembly, with the vehicle roof being omitted.

As illustrated in FIG. 1 a vent assembly is provided for mounting in an opening of a mobile or fixed shelter or camper type vehicle or the like. The vehicle conventionally has a structural wall member or roof 10 in which is cut an opening adapted to receive the vent assembly 12. Although the size and shape of the opening and mating vent assembly can be varied according to particular requirements or design choice, it is most common to make devices of this type of a rectangular or a square configuration and such an arrangement is illustrated in the drawings. The vent assembly of the present invention would readily lend itself to a generally circular, eliptical or other curved configuration. Nevertheless, rectangular openings are more readily formed in a vehicle wall or roof and thus the illustrated configuration is presently preferred. The vent frame assembly includes a square vent frame having a peripheral wall 14 and a peripheral securing and sealing flange 16 that cooperates with a frame ring 18 by means of which the vent assembly is secured to the structural wall member 10. Ring 18 is detachably secured to the frame flange 16 so that, upon mounting of the vent assembly, the structural wall member 10 may be firmly clamped between the flange 16 and ring 18 with suitable sealing means (not shown) interposed. Fastening means such as screws, nails, rivets, or the like (not shown) extend through the members 16, 18 to fixedly attach the vent assembly in conventional fashion to the structural wall member of the vehicle.

Integrally formed with the perimetric vent frame 14, 16 is a vent cover generally indicated at 20. The vent cover has a dome-like configuration, extending outwardly of the vehicle wall ventilation opening and rearwardly from a forward portion 24 of the vent frame. The dome-like cover also extends forwardly from a rear portion 26 of the vent frame and laterally from both sides toward the dome center. Thus, the vent cover has an outwardly and rearwardly sloping front face 28 an outwardly and forwardly sloping rear face 30, and laterally and outwardly sloping sides that all meet at an outer vent cover region 32 which is positioned at the outermost part of the dome-like vent cover.

The forward frame portion 24 is positioned toward the front of the vehicle to which the vent assembly is mounted and the rear frame portion 26 is positioned toward the rear of the vehicle.

Forward face 28 of the cover includes relatively depressed side sections 34, 36 each of generally triangular or gore shape, each sloping outwardly and rearwardly from the front frame portion to the outer cover region and each tapering from a wider front portion to a more narrow rear portion at the outer cover region. Similarly, rear face 30 has depressed side sections 38, 40 of generally triangular or gore shape, sloping outwardly and forwardly from wider portions at the rear of the vent assembly to more narrow portions adjacent the outer cover region 32. Thus, the center of the vent cover has a longitudinally extending continuous rib or raised reinforcing section formed by central sections of the front and rear faces 28, 30 and the outer region 32.

The cover is outwardly curved from side to side in a plane normal to the fore and aft direction and similarly curved from front to back in a longitudinally extending plane. The lateral section of the cover between front and rear gores 34, 38 and side portion 42 of the cover, and opposite lateral cover section between gores 36 and 40 and cover side portion 44, at the other side of the cover, each has a generally triangular opening 50, 52 formed therein. The openings have relatively long lateral edges 54, 56 respectively and relatively short interior edges, such as edges 58, which in effect, form the apices of the triangular openings 50, 52.

The cover and frame are formed as an integral unit, as by injection molding or vacuum forming, for example, of a suitable strong and resilient plastic of the type commonly used for such ventilation covers. Such plastics include tenite, butyrate, polypropylene and ABS. The cover extends outwardly from the plane of the vehicle roof or wall opening for a total distance of approximately four inches or less in a presently preferred configuration. It presents a relatively low profile, curved in all directions, and is sufficiently strong and resilient so that it may be readily deflected a reasonable amount upon impact with a fixed overhead structure without any permanent deformation or damage.

Thus, it will be seen that the cover is of simple dome shape, having a raised longitudinally extending reinforcing portion 28, 30, 32 and a pair of relatively large oppositely disposed triangular lateral cover openings.

A longitudinally extending hinge member is provided on each side of the cover in the form of arcuate channels 60, 61. The channels extend for the full length of the long lateral opening edges 54, 56, each receiving a long cylindrical hinge bead 62, 63 formed upon and extending along the full length of lateral edges of each of a pair of cover doors 64, 66. Each cover door is of generally triangular shape, having a configuration that mates with the similar shape of its respective opening and is slightly larger than the opening so that door edge portions may overlap the inner sides of the peripheries of the cover openings. Each door, being of a generally triangular shape, has a relatively long hinged side on which is formed the hinge bead 62, 63 and a relatively short free interior end that is positioned adjacent the outermost cover region when the door is in closed position.

Each door is outwardly bowed, being convexly curved outwardly in a transverse plane that is perpendicular to the plane of the vent frame. The doors are not curved longitudinally. Outwardly facing continuous perimetric channels 70, 72 are formed in the respective doors and each carries therein a continuous resilient sealing strip 74, 76, formed of rubber or a suitable sponge material or the like. To enhance sealing pressure on the seals 74, 76, the cover is formed with inwardly projecting perimetric ribs 78, 80 extending continuously around the respective cover openings. These ribs project into and deform the soft sealing strips when the doors are closed to enhance sealing as illustrated in FIGS. 3 and 5.

Each door is pivoted to the side of the cover about a longitudinal axis extending through the central axes of the arcuate channels 60, 61 and cylindrical door beads 62, 63. The channel openings are slightly smaller than the diameters of the respective beads whereby the beads may be snapped into position within the channels as the channel edges are resilinetly spread apart. Thus the doors are hinged to the cover for a limited amount of pivotal motion. The channel openings are sufficiently wide to enable the desired amount of pivotal motion as will be described hereinafter. Obviously, conventional hinges or other types of hinge arrangements may be employed to provide required pivotal motion of the doors.

At the free interior end of each door there is formed a latch receiving mechanism in the form of cylindrical sleeves 84, 86, each closed at its laterally outer end and having laterally inwardly facing open ends mutually aligned and spaced a small distance from one another. A compression member in the form of a compression spring 88 has its opposite ends captured within and bearing upon the closed ends of the sleeves 84, 86. Stop support members 90, 92 extend longitudinally across the sleeves 84, 86 and have depending flanges 94, 96 at both front and rear. The flanges are apertured to receive respective ones of two longitudinally extending headed pins 98, 100. Stop support members 90, 92 have a generally angulated cross section with one leg lying parallel to the vent frame and the other normal to the frame when the door is in closed position. A rectangular stop plate or connecting member 102 has a continuous outwardly extending peripheral flange 104, front and back portions of which have laterally elongated slots 108, 110 which receive the respective pins 98, 100 to provide a lost motion or pivotable and slidable connection between the stop plate and each door.

Longitudinally extending stop support members 90, 92 are each formed with a plurality of longitudinally spaced laterally extending ribs 112, 114 such as those indicated at 112, and 114 which bear against the stop member flanges 104 in open position, thereby helping to limit motion of the doors beyond the position illustrated in FIG. 6. Plate 102 together with pins 98, 100 and slots 108, 110 also limit the opening motion of the doors.

To the rear of the sleeves 84, 86 and spring 88 stop plate 102 is formed with an inwardly projecting boss 120 (FIGS. 3, 6), having a bore that slidably receives an operating handle shaft 122. Shaft 122 carries on its innermost end an operating knob 124 and on its outermost end a spring stop in the form of an enlargement 126. A compression spring 128 is mounted on the shaft 122 and has its opposite ends bearing respectively on the stop plate 102 and the enlargement 126.

In closed position, shown in FIG. 3, the doors are bent slightly beyond their unstressed condition and the spring 88 is under compression so that the doors are each urged in respective counterclockwise and clockwise directions around their hinge axes as viewed in this figure. However, further motion beyond the illustrated closed position is resisted by abutment of the doors against the inner surfaces of the peripheries of the cover openings. To open the doors handle knob 124 is grasped and pulled inwardly of the ventilation opening (downwardly as shown in FIG. 3) whereby the spring 128 moves stop plate 102 downwardly and thus the free ends of the two doors are moved downwardly in unison through the over-center position to the open position of FIG. 6. As the doors reach the open position of FIG. 6, ribs 112, 114 of the stop member supports 90, 92 abut the upstanding perimetric flange 104 of the stop plate 102 and further motion of the doors beyond the open position is prevented. Upon release of the knob 124, after moving the doors to the open position, spring 128 expands to raise the operating handle which no longer projects into the interior of the vehicle to any significant extent. The doors are closed by pushing up on the plate 102 of knob 104 until the over center position is passed whereupon the doors snap shut.

If deemed necessary or desirable a screen 125 may be fixed to and extend across the vent frame. The screen is provided with an opening 127 of a size sufficient to allow the stop plate 102 to pass therethrough during motion of the doors between open and closed position.

The doors are formed of a suitable strong resilient plastic material which may be the same as the material of which the cover is formed. In a presently preferred configuration the doors have little or no curvature in a fore and aft direction of the vent whereas they are curved in the transverse direction. Such transverse curvature enables the doors to mate with the like transverse curvature of the cover itself and, more importantly, provides an improved closing and sealing action as will be described below.

The described vent is symmetrical both about a fore and aft or a longitudinal axis extending from front frame portion 24 toward rear frame portion 26 and also about a transverse axis. However, it must be oriented upon a vehicle so that either frame portion 24 or frame portion 26 is forward. In other words it can be mounted in either of two positions 180° apart. The vent will operate best with the longitudinal extent of the reinforced cover portion 28, 30, 32 extending fore and aft of a vehicle on which it is mounted. In this orientation the vent acts as an air foil, deflecting air flowing to and over the front face 28, 34, 36 of the vent outwardly of the vent assembly thereby increasing flow velocity. Increased flow velocity provides decreased air pressure. Thus, at the outermost cover region, in the area of the central section 32 and laterally thereof, the air flows across the cover openings at increased velocity and decreased pressure. Accordingly, with the doors open, in the position of FIG. 6, air is extracted from the interior of the vehicle.

Significant features of the described vent are the simple manner in which it is opened and closed and the improved sealing and latching in closed position. The total lengths of the compression link (formed by spring 88 in this embodiment) and the two doors (as measured from their pivots to the abutting ends of spring 88) is greater than the distance between the two door pivot axes. This provides an over-center toggle action. Each door is closed by such toggle like or over-center action in which a force is exerted on the free interior end of the door, generally directed toward the door hinge. Such force tends to compress the door laterally between its free end and its hinged side. Since the door is resilient and outwardly bowed in its normal unstressed condition, such compressive force tends to increase the bowing of the door.

The compressive force exerted upon the free end of each door can be provided by many different mechanisms and in general by a compression link interposed between the opposed free ends and pressing against such ends to react compressive force on one door against compressive force on the other. In the preferred arrangement of FIGS. 1-7, such reactive compressive forces are conveniently provided by the spring 88. The spring is under compression in all positions of the door as it moves between its closed position of FIG. 3 and its open position FIG. 6. In the closed position of FIG. 3 the spring exerts a force that is directed laterally outwardly against each door and which has a component $F_L$ that is exerted along a line 130 extending from the center of the closed end of sleeve 84 to the hinge axis, substantially in the plane of the cover opening. This component of the force tends to increase the normal unstressed outwardly convex curvature of the door. The spring force is exerted axially of the spring and thus parallel to the plane of the vent frame in closed position of the vent. The line of action of the spring force (the spring axis) is displaced outwardly of the door hinge axes and thus exerts a closing moment of force.

Particularly because of the triangular shape of the door the compressive force exerted at the apex of the door triangle (actually at its free end) subjects the front and back door edges themselves to compressive force which tends to increase the bending of such front and back edges. It is at these edges that a significant part of the door sealing is accomplished. The triangular door configuration thus translates the force exerted laterally by the spring on the door free ends into sealing force $F_O$ that press the lengths of the door front and back edges outwardly against the overlapped periphery of the covering opening.

The equal and opposite reactive edge forces exerted by the compression spring 88, are directed generally toward the door hinges at the lateral edges of the doors but actually extend at a small angle to the plane of the cover openings, an angle in the order of 20° for example, and each thereby produces a moment of force that tends to close the door and maintain it in its closed position. Thus, sealing of the doors at their free ends is also enhanced and the doors are firmly held in closed position by forces represented at $F_f$.

It will be seen that the described arrangement of the two opposed doors with an interposed compression member 88 provides an over center or toggle type action. As the doors move from the closed position of FIG. 3 toward the open position of FIG. 6 their adjacent free ends move in similar arcuate paths that approach each other at an intermediate position. Thus the distance between the free ends decreases. This decrease in distance is accommodated, in the arrangement of FIGS. 1-7, by resilient deformation of the doors and also by compression of the spring 88. The strength of spring 88 is made sufficiently great so that its resistance to axial compression is greater than compressive bending resistance of the outwardly bowed doors. Stated otherwise, the compliance of the spring is less than the compliance of the resilient doors so that the dimensional change of the doors (by increased bowing) is greater than the decrease of spring length during over-center action. In a preferred mechanization, about three fourths of the deformation required for the over-center action is accounted for by increased bending of the resilient doors. In fact, in some embodiments (to be described below) the interposed compressive member (analagous to compression spring 88) is a solid metal or plastic link or bar and may experience negligible compressive deformation. Therefore, the doors themselves provide most of the toggle or over the center action that takes place in motion of the doors between open and closed position. The parts are dimensioned and resiliencies of the several components chosen so that with the doors in the closed position of FIG. 3 a significant compressive force is still exerted by the spring against the free ends of the door and thus each is slightly bowed further upwardly, from its normal unstressed configuration, under the influence of this force. This further outward bowing in closed position results in increased compression and further deformation of the resilient sealing strips 74, 76.

Since many plastic materials exhibit a tendency to creep or change shape and dimension under stress, the curvature of the plastic resilient doors may increase with time, or the doors may warp or otherwise change shape. The compressive spring 88 not only accommodates such changes but also enables less stringent dimensional tolerances in manufacture.

Figure 8:
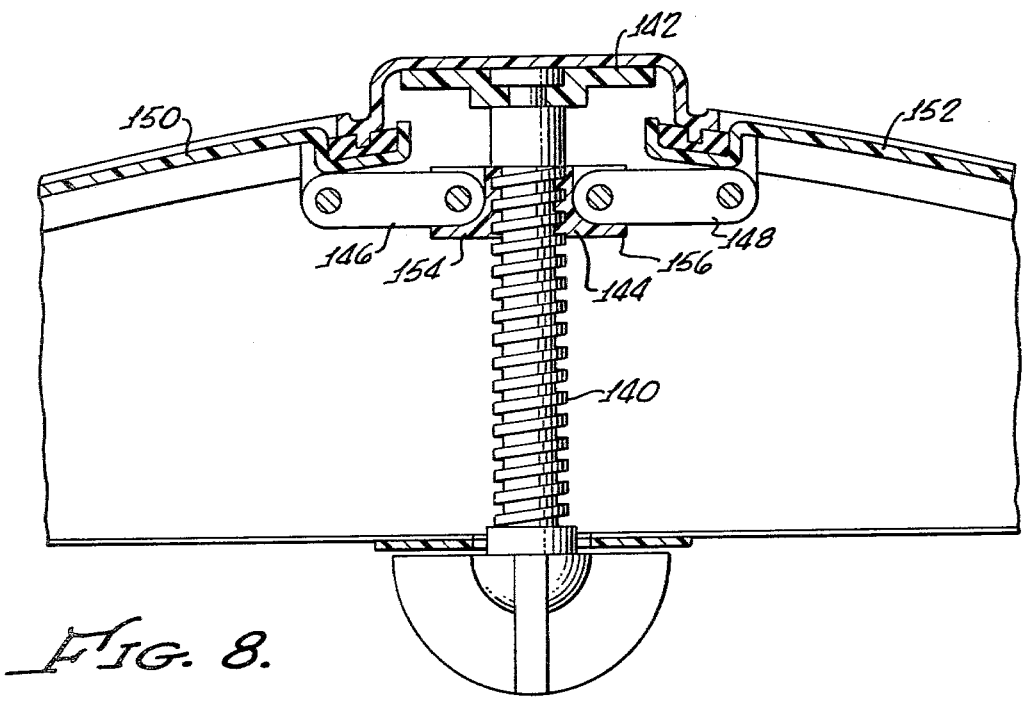
FIG. 8 is a sectional view of parts of a modified form of vent assembly, showing a compression linkage connected between the free ends of the resilient doors.

As mentioned above, elasticity of the doors themselves is significantly involved in the over-center toggle action. In fact, the interposed compression member 88 may have a greater amount of resistance to deformation and, in a limiting case, may be comprises of a solid bar or link extending between and abutting against the facing free ends of the two doors. Thus, as shown in FIG. 8 a door operating and latching toggle linkage may comprise a threaded screw 140 having an end rotatably captured in a fitting 142 that is secured to and extends inwardly of the outer cover region. The screw is received in a threaded nut 144 that is pivotally connected to rigid links 146, 148 which in turn are pivoted to free ends of the two doors 150, 152. The cover, doors and their interconnections are identical to those previously described except for the toggle linkage.

In the arrangement of FIG. 8 substantially all of the deflection required for the over-center toggle action takes place by increased bending of the doors. The described toggle links 144, 146 and 148 continue to reactively exert compressive edge forces on the door ends to maintain the doors in closed position and to enhance sealing against the cover openings. The doors are opened and closed by rotating screw 140.

As the screw rotates in one direction the doors are moved in unison to the open position. Rotation of the screw in the other direction moves the doors in unison to the illustrated closed position. Further motion of nut 144 may be limited by abutment of the links with inner sections 154, 156 of the nut. Thus link 146 can pivot clockwise but not counter clockwise relative to nut 144 from the illustrated position. Similarly link 148 can pivot counter clockwise but not clockwise (as viewed in FIG. 8).

Figure 9:
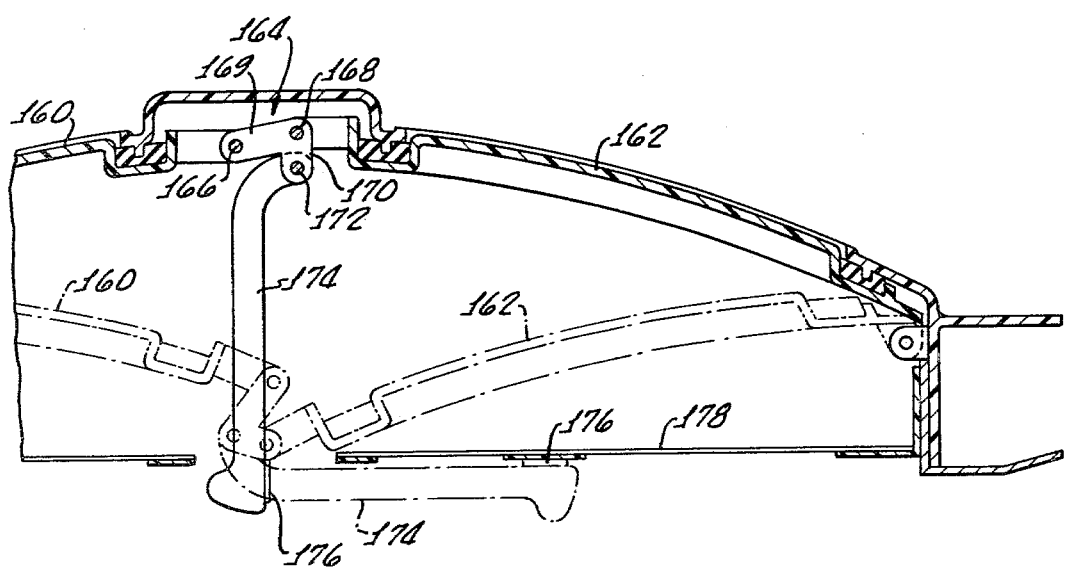
FIG. 9 illustrates still another modification of a toggle mechanism for door operation.

Still another modification of a door opening mechanism is illustrated in FIG. 9 wherein doors 160, 162 are identical to doors 64, 66 previously described except for the toggle linkage interconnecting the adjacent free end portions of the doors. In this arrangement a bell crank lever 164 is pivoted at ends 166, 168 of a first lever arm 169 to the respective adjacent free ends of the two doors. The second arm 170 of the bell crank lever is pivoted at 172 to a curved end of an operating rod 174. To move the door from the open position illustrated in solid lines, to the closed position, illustrated in dotted lines in FIG. 9, rod 174 is pulled downwardly and then pivoted outwardly (counter clockwise as viewed in FIG. 9) to be secured by means such as a Velcro fastening strip 176 to a portion of the screen 178 extending across the vehicle ventilation opening. The door pivots are both shifted slightly inwardly to accommodate the pivotal motion required by the bell crank.

In the arrangement of FIG. 9 arm 169 of the bell crank lever between pivot points 166, 168 is under compression in the closed position of the doors and thus exerts oppositely directed reactive forces against the door edges tending to increase the outward curvature thereof, to enhance the sealing and to maintain the doors in closed position.

Although a presently preferred mechanization of the invention embodies a pair of lateral opposed doors mounted in a vent cover having both longitudinal and transverse symmetry, it will be readily understood that principles of the invention may be applied to vent covers without such symmetry and which include one door or three or more doors. For a cover that has but one opening and one door the compression member, such as the spring 88 or an equivalent relatively rigid compression link, has one end mounted for motion together with its opposite end (the end bearing upon the door edge) so as to maintain the compressive force directed against the door edge and generally in the plane of the door throughout at least a portion of the door motion from the closed position. Such a single door and its opening could be located either on one side or to the rear of the outer cover region.

For three or four doors a compression member interposed between the adjacent free ends of all of the doors comprises a single hub having several compressive arms or compression springs extending to the free ends of each of the several doors, respectively, so that all doors are compressively bowed against the same centrally located compression member and all doors move in unison between open and closed positions.

In the embodiments of FIGS. 1-7 and 9, the doors will spring open if the vent strikes a low overhanging object and little or no permanent damage may be suffered.

The foregoing detailed description is to be clearly understood as given by way of illustration and example only, the spirit and scope of this invention being limited solely by the appended claims.

We claim:

1. A vehicle vent assembly comprising
a vent frame adapted to be mounted in an opening of a vehicle and having front, back and side portions,
a vent cover fixed to said frame and having a cover body extending rearwardly and outwardly from a front portion of said vent frame to provide an area of decreased pressure as said vehicle moves forwardly, said cover body having a cover opening extending across at least a part of said area of decreased pressure laterally toward a side portion of said vent frame,
a resilient door,
means for mounting said door for motion to a first position wherein said cover opening is closed and sealed by said door and to a second position wherein said door is displaced inwardly from said cover opening at said area of decreased pressure, and toggle means including a compression spring abutting an edge portion of said door for holding said door in said second position, wherein said spring tends to compress and said door tends to bend as the door moves between said portions, and wherein compliance of said door is greater than compliance of said spring whereby said door will experience a greater dimensional change than the spring during motion between said positions.

2. A vent assembly for a vehicle having a ventilation opening formed in a wall thereof, said assembly comprising
a vent cover adapted to be fixed to a vehicle wall to cover a ventilation opening therein, said vent cover comprising a front wall portion sloping rearwardly and outwardly to an outer vent region, whereby air flowing over said vent assembly is deflected by said front wall portion to flow with decreased pressure at said outer vent region,
said vent cover having a pair of opposed cover openings extending laterally in opposite directions across at least part of said outer vent region,
first and second doors having remote sides pivotally connected to said cover and having adjacent mutually spaced free end portions,
said doors being movable to a first position wherein said cover openings are closed and sealed by said doors and to a second position wherein said doors are displaced inwardly of said cover openings at said outer vent region, and
a compression spring interposed between said free end portions, wherein each free end portion carries an outwardly opening sleeve, said spring having opposite ends thereof received in said sleeves.

3. The vent assembly of claim 2 including a means for interconnecting said doors to limit relative motion thereof.

4. The vent assembly of claim 3 wherein said means for interconnecting comprises a connecting member having a movable connection with both said doors, whereby said doors may be moved in unison between said positions by moving said connecting member relative to said vent cover.

5. A vehicle vent assembly comprising
a vent frame adapted to be mounted in an opening of a vehicle, said vent frame having front, back and side members,
a vent cover fixed to said frame and having a generally dome-like configuration sloping rearwardly and outwardly to an outer dome region and sloping forwardly and outwardly to said outer dome region, said vent cover having a pair of mutually opposed cover openings therein each sloping outwardly from a respective one of said side members toward said outer dome region, each said opening having a relatively small extent adjacent said outer dome region and having a relatively great extent on the side thereof remote from said outer dome region,
first and second doors pivoted to said cover and side members adjacent said side members and each having a free end, each said door having a shape substantially conforming to the shape of a respective one of said openings and being slightly larger than the associated opening to overlap opening perimeters, said doors being pivotally movable to a closed position in overlapping engagement with the perimeters of said openings and to an open position in which said free ends are displaced inwardly of said cover, and
compression spring means interposed between said free ends for holding said doors in said closed position, wherein the doors and spring are dimensioned to provide an over-center toggle action, and wherein at least one door is outwardly bowed and has a compliance less than the compliance of said spring.

* * * * *